United States Patent
Lombaert et al.

(10) Patent No.: US 10,526,798 B2
(45) Date of Patent: Jan. 7, 2020

(54) CUSTOM-MADE COVERING PANELS BY DIGITAL PRINTING OF BASE PANELS

(71) Applicant: Beaulieu International Group NV, Waregem (BE)

(72) Inventors: Pol Lombaert, Nazareth (BE); Jonas Guido Feys, Mariakerke (BE)

(73) Assignee: Beaulieu International Group NV, Waregem (BE)

( * ) Notice: Subject to any disclaimer, the term of this patent is extended or adjusted under 35 U.S.C. 154(b) by 0 days.

(21) Appl. No.: 15/760,678

(22) PCT Filed: Sep. 16, 2016

(86) PCT No.: PCT/EP2016/071941
§ 371 (c)(1),
(2) Date: Mar. 16, 2018

(87) PCT Pub. No.: WO2017/046309
PCT Pub. Date: Mar. 23, 2017

(65) Prior Publication Data
US 2018/0320388 A1    Nov. 8, 2018

(30) Foreign Application Priority Data
Sep. 17, 2015   (EP) .................................. 15185742

(51) Int. Cl.
*E04F 15/10*    (2006.01)
*B32B 27/06*    (2006.01)
(Continued)

(52) U.S. Cl.
CPC .............. *E04F 15/105* (2013.01); *B32B 3/30* (2013.01); *B32B 5/02* (2013.01); *B32B 5/16* (2013.01);
(Continued)

(58) Field of Classification Search
CPC .. B32B 5/245; B32B 5/18; B32B 3/30; B32B 27/40; B32B 27/065; E04F 15/105; E04F 2290/042
See application file for complete search history.

(56) References Cited

U.S. PATENT DOCUMENTS 3,978,258 A * 8/1976 Faust ...................... B44C 1/205
                                                                  428/159
4,264,643 A * 4/1981 Granata ............... D06N 7/0005
                                                                  156/244.23
(Continued)

FOREIGN PATENT DOCUMENTS

CN     1459081 A     11/2003
CN     1724255 A     1/2006
(Continued)

*Primary Examiner* — Babajide A Demuren
(74) *Attorney, Agent, or Firm* — James Creighton Wray

(57) ABSTRACT

A base panel suitable to be processed into a covering panel, consisting of the following layers: (i) a substrate having a top surface, (ii) a resilient layer having a top surface and a bottom surface, whereby the bottom surface is connected to the top surface of said substrate, and (iii) optionally, a contact layer between the bottom surface of said resilient layer and the top surface of said substrate. A covering panel further comprising a digitally printed decor on the top surface of the resilient layer of the base panel, and a process of producing covering panels from said base panels.

14 Claims, 1 Drawing Sheet

(51) Int. Cl.
  *B32B 27/30* (2006.01)
  *B32B 38/00* (2006.01)
  *B32B 5/02* (2006.01)
  *B32B 5/16* (2006.01)
  *B32B 5/18* (2006.01)
  *B32B 5/24* (2006.01)
  *B32B 21/08* (2006.01)
  *B32B 27/12* (2006.01)
  *B32B 27/20* (2006.01)
  *B32B 27/22* (2006.01)
  *B32B 27/40* (2006.01)
  *B32B 3/30* (2006.01)
  *E04F 13/08* (2006.01)
  *B32B 37/15* (2006.01)
  *B32B 38/06* (2006.01)

(52) U.S. Cl.
  CPC ........ *B32B 5/18* (2013.01); *B32B 5/245* (2013.01); *B32B 21/08* (2013.01); *B32B 27/065* (2013.01); *B32B 27/12* (2013.01); *B32B 27/20* (2013.01); *B32B 27/22* (2013.01); *B32B 27/304* (2013.01); *B32B 27/308* (2013.01); *B32B 27/40* (2013.01); *B32B 38/145* (2013.01); *E04F 13/0866* (2013.01); *E04F 15/107* (2013.01); *B32B 37/153* (2013.01); *B32B 38/0012* (2013.01); *B32B 38/06* (2013.01); *B32B 2038/002* (2013.01); *B32B 2250/05* (2013.01); *B32B 2255/102* (2013.01); *B32B 2255/26* (2013.01); *B32B 2260/021* (2013.01); *B32B 2260/046* (2013.01); *B32B 2262/101* (2013.01); *B32B 2266/0235* (2013.01); *B32B 2307/4023* (2013.01); *B32B 2307/412* (2013.01); *B32B 2307/554* (2013.01); *B32B 2307/732* (2013.01); *B32B 2307/75* (2013.01); *B32B 2310/0831* (2013.01); *B32B 2419/04* (2013.01); *B32B 2607/00* (2013.01); *E04F 2203/04* (2013.01); *E04F 2290/042* (2013.01)

(56) References Cited

U.S. PATENT DOCUMENTS

| | | | | |
|---|---|---|---|---|
| 4,781,987 | A * | 11/1988 | Bolgiano | C08J 5/12 428/424.6 |
| 5,169,704 | A * | 12/1992 | Faust | B44F 7/00 428/141 |
| 5,458,953 | A * | 10/1995 | Wang | B05D 7/54 428/195.1 |
| 6,277,233 | B1 * | 8/2001 | Daley | B44C 1/221 15/238 |
| 2015/0050469 | A1 | 2/2015 | Blanchard | |
| 2016/0002468 | A1 * | 1/2016 | Heikkila | C08J 5/043 428/35.6 |

FOREIGN PATENT DOCUMENTS

| | | |
|---|---|---|
| CN | 101300142 A | 11/2008 |
| CN | 101743126 A | 6/2010 |
| CN | 101784385 A | 7/2010 |
| CN | 103890289 A | 6/2014 |
| EP | 1362695 A1 | 11/2003 |
| EP | 1600288 A1 | 11/2005 |
| KR | 20130104391 A | 9/2013 |
| WO | 0211070 A1 | 2/2002 |
| WO | 2009008857 A1 | 1/2009 |
| WO | 2009066081 A1 | 5/2009 |
| WO | 2015060778 A1 | 4/2015 |

* cited by examiner

CUSTOM-MADE COVERING PANELS BY DIGITAL PRINTING OF BASE PANELS

TECHNICAL FIELD

The present invention relates to the field of covering panels. More specifically, the present invention relates to a base panel suitable to be processed into a covering panel for use as floor panel, wall panel or ceiling panel, as well as processes and systems for producing said panels.

INTRODUCTION

Covering panels such as floor, wall or ceiling covering panels are comprised of a substrate layer for providing structural and mechanical characteristics, a decoration layer for providing a visual aspect and a protective layer for providing durability. Many methods are reported to create covering panels in view of specific mechanic, acoustic or visual designs.

With the ascent of improved digital printing technologies, such digital printing technologies are employed for producing covering panels. European patent application EP15151552.5 filed on 16 Jan. 2015 discloses such a technology. WO 2015/060778 describes a method to form a digital print on a substrate comprising a polymer material by bonding particles in powder form to the surface of the substrate.

In spite of many advances, it is still common practice in industry to produce large series of panels with only a limited number of decors, which typically results in large stocks. The large stocks incur high costs for storing of the panels and bring the risk of waste material when a stock is not fully sold. As a result, a customer can only choose from a limited number of decor designs, while there is a tendancy and desire to order panels with custom-made decor design.

The present invention aims to provide a solution to one or more of the above mentioned obstacles or shortcomings.

SUMMARY OF THE INVENTION

In a first aspect, the present invention relates to a base panel suitable to be processed into covering panel, consisting of the following layers:
  i. a substrate having a top surface,
  ii. a resilient layer having a top surface and a bottom surface, whereby the bottom surface is connected to the top surface of said substrate, and
  iii. optionally, a contact layer between the bottom surface of said resilient layer and the top surface of said substrate.

In a second aspect, the present invention provides a covering panel such as a floor panel, a wall panel or a ceiling panel, comprising a base panel according to the first aspect of the invention, further comprising a decor which is digitally printed on the top surface of said resilient layer.

In a third aspect, the present invention provides a process of producing covering panels, comprising the steps of: (i) digitally printing a decor on the top surface of a base panel according to the first aspect of the invention, and (ii) providing a wear layer onto said decor.

In a fourth aspect, the present invention provides a system for producing covering panels such as floor panels, wall panels or ceiling panels, comprising: a server; a database, configured to store one or more images; a module, for uploading one or more customized images and for storing said images into said database; a digital printer, configured to print said one or more customized images onto a set of base panels according to the first aspect of the invention.

DESCRIPTION OF THE FIGURES

By means of further guidance, figures are included to better appreciate the teaching of the present invention. Said figures are intended to assist the description of the invention and are nowhere intended as a limitation of the presently disclosed invention.

As shown in FIG. 1, the base panel has a foamed substrate A and a resilient layer B with a contact layer between the bottom surface of the resilient layer B and the top surface of the substrate A. The resilient layer B, as shown, is multi-layered $B_i$-$B_{iv}$. A reinforcement layer $B_{ii}$, is between a backing layer $B_i$ and a synthetic foamed layer $B_{iii}$ and a top layer with a naked surface.

FIG. 2 adds digital printing C and a wear layer D.

DETAILED DESCRIPTION OF THE INVENTION

Figure 1:
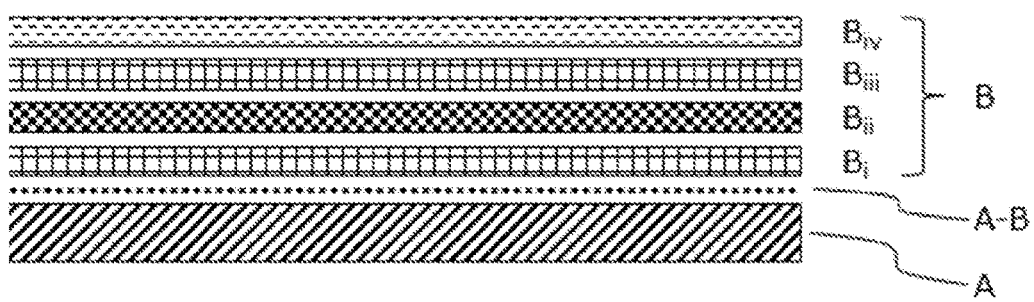
FIG. 1 shows a base panel according to the first aspect of the invention.

The recitation of numerical ranges by endpoints includes all numbers and fractions subsumed within that range, as well as the recited endpoints.

In a first aspect, the present invention provides a base panel suitable to be processed into a floor panel, a wall panel or a ceiling panel, consisting of the following layers:
  i. a substrate having a top surface,
  ii. a resilient layer having a top surface and a bottom surface, whereby the bottom surface is connected to the top surface of said substrate, and
  iii. optionally, a contact layer between the bottom surface of said resilient layer and the top surface of said substrate.

1. Base Panel

The base panel can have or be dimensioned to any suitable length and/or width and can be provided in any shape, such as a rounded shape and a polygonal shape (triangle, rectangle, square, pentagon, hexagon, heptagon or octagon). The base panel can be provided in the shape of a square (tile) with a side length of from 20 cm to 100 cm, preferably from 25 cm to 80 cm, more preferably from 30 cm to 60 cm Preferably, the base panel is rectangular, with short sides having a width of from 10 cm to 50 cm, preferably from 10 cm to 30 cm, and long sides having a length of from 50 cm to 300 cm, preferably from 80 cm to 250 cm.

The base panel may further comprise coupling parts for assembling several panels together (further referred to as a 'locking system'). Locking systems have been widely used for many years and are well known to the artisan. Most popular locking systems are glueless locking systems where both horizontal and vertical locking of the panels are realised with a tongue along one (edge) side and a groove along the opposite (edge) side of the panel. Typically tongue and groove locking systems are integrally made with the panel. An alternative locking system comprises a plurality of staggered hooking tongues, extending outwardly from the edges of the panel. Such a system is for example described in European patent application number 14164155.5, assigned to BerryAlloc NV.

Further, the base panel may be provided with a bevel along one or more of its side edges. Such bevels are known in the art and may be provided to the base panel panel using any method known in the art.

1.1 Substrate

The substrate may be wood-based (e.g. a fiberboard (MDF, HDF), or a particle board), or may comprise at least one layer of a wood-based material. The substrate may also be made of, or at least comprising a layer of, synthetic material and optionally a filler material, and which may optionally be foamed. The substrate may also comprise composite materials, or one or more layers thereof, such as wood-plastic composites (WPC), referring to a composite structure comprising a wood-based material and a synthetic material, which optionally may be foamed. A substrate according to current invention preferably comprises a core with a top surface and bottom surface as well as side surfaces.

Said layers may be identical or different with respect to composition and/or physical properties.

Synthetic Material

The term "synthetic material" as used in the context of the current invention, can be a single polymer or a blend of two or more polymers. The synthetic material can be, for example, a thermoplastic polymer, a thermosetting polymer, a rubber (elastomer), or any combinations thereof. Further, the synthetic material can be comprised of, for example, any type of polymer, such as a homopolymer, a copolymer, a random polymer, alternating polymer, graft polymer, block polymer, star-like polymer, comblike polymer, crosslinked polymer, and/or vulcanized polymer. The synthetic material can be comprised of one or more polyblends. The synthetic material can be, for example, comprised of a thermoplastic elastomer (TPE), an interpenetrating polymer network (IPN); simultaneous interpenetrating polymer network (SIN); or interpenetrating elastomeric network (IEN). The synthetic material may also include mixtures of synthetic polymers and natural polymers.

In one particular example, the polymeric material is a thermoplastic polymer that includes vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as polycarbonate, polyimide, polysulfone, and polyphenylene oxide and sulfide resins and the like.

The synthetic material can be a suspension grade or mass polymerization grade homopolymer resin having a preferred molecular weight as reflected by their K-value. The K-value of a polymer is a measure for the polymer chain length and is described in detail by K. Fikentscher in "Cellulosechemie", 13, 58 (1932). A preferred K-value of a polymer in a synthetic material is comprised between 50 and 80, and more preferably between 60 and 70, and preferably the molecular weight distribution and particle size distribution are narrow in order to provide a good balance between processability and material properties. A synthetic material compound used to form the substrate can be a PVC powder compound that has good impact strength, ease of processing, high extrusion rate, good surface properties, excellent dimensional stability, and indentation resistance.

Additives

The substrate may include one or more additives known in the art such as fillers, plasticizer or stabilizers.

The substrate preferably comprises at least one filler or filler source such as post-industrial recycled or post-consumer recycled materials such as gypsum, glass, energy by-products, wood, plastic (e.g. PVC), recycled panels or parts thereof, and the like, or all of these.

The filler can also include any other filler, including any conventional filler, which can be used in vinyl tiles, and/or rubber compositions. The filler can be natural filler or synthetic filler. The filler can be in the form of particles, short fibres, flakes, and other discrete forms. Inorganic filler (such as mineral fillers) as well as organic (non-mineral) fillers may be used. Examples of inorganic filler include, but are not limited to, hydrated alumina, magnesium carbonate, calcium carbonate, calcium sulfate, silica, precipitated silica, fumed silica, fly ash, cement dust, glass, clay, chalk, limestone, marble, talc, mica, calcium carbonate, barium sulfate, silicates, aluminium trihydrate, kaolin, wollastonite, gypsum, solid or hollow glass microspheres, and the like. Examples of non-mineral or organic filler include, but are not limited to, carbon black, wood flour, cellulose-derived materials, ground rice hulls, solid or hollow temperature resistant polymer microspheres or microbeads (e.g., phenolic microspheres), and the like. Carbon black, for example, can be used as filler in rubber-based substrate, or other types of substrate panels. In a preferred embodiment, the filler is chosen from the group consisting of calcium carbonate, magnesium carbonate, talc, chalk, wollastonite, mica, and combinations thereof. Even more preferred, the filler is magnesium carbonate in combination with any of talc, wollastonite or mica.

Filler may be present in the substrate in an amount from 10 wt. % to 70 wt. %, based on the total weight of the substrate. In some embodiments, filler may be present in an amount from 20 wt. % to 60 wt. % based on the total weight of said substrate. In other embodiments, filler may be present in an amount from 40 wt. % to 70 wt. % based on the total weight of said substrate. In yet other embodiments, filler may be present from 10 wt. % to 50 wt. % based on the total weight of said substrate.

The substrate may comprise one or more plasticizers. The term "plasticizer" as referred herein is to be understood as a compound used to increase the fluidity or plasticity of a material, typically a polymer. For example, the plasticizer may be a phthalic diester, such as diisononyl phthalate (DINP). Other examples of plasticizer include, but are not limited to ditridecylphthalate, diisodecyl phthalate, dipropylheptyl phthalate, diisooctyl terephthalate (DOTP), benzoates, adipates, any o-phthalate free plasticizers, natural-material based plasticizers, and the like. The one or more plasticizers may be present in the substrate in an amount of less than 15 wt. %, based on the total weight of said substrate. More preferably, said one or more plasticizers is present in an amount of less than 10 wt. %, even more preferably less than 5 wt. %, based on the total weight of said substrate, and even more preferably, in an amount of less than 2 wt. %. This is advantageous, because a reduced amount of one or more plasticizers provides a substrate with high elasticity modulus. Said high elasticity modulus corresponds to a high rigidity of the obtained panel.

In a highly preferred embodiment, the substrate is substantially free of plasticizer. By the term "substantially free of plasticizer" is to be understood that no plasticizers are mixed with the synthetic material in order to form a substrate. Accordingly, said plasticizer is present in said substrate in an amount of less than 2 wt. %, based on the total weight of said substrate, more preferably in an amount of less than 0.5 wt. %, and even more preferably in an amount of less than 0.1 wt. %. Most preferably, no plasticizer is present in the substrate.

The substrate can also include at least one heat stabilizer. A stabilizer typically provides heat stability and/or UV light stability to a formulation of on a synthetic material. As a non-limiting example, when PVC is used as synthetic material, the stabilizer may be a calcium-zinc stabilizer. A calcium-zinc stabilizer containing about 5.5 wt. % or more zinc may be used, such as about 6.0 wt. % to about 10.0 wt. % zinc. Specific non-limiting examples of zinc-calcium stabilizers are supplied by Baerlocher. Other examples of stabilizers include, but are not limited to, barium-cadmium stabilizers, barium-zinc stabilizers, organotin stabilizers, epoxidized soybean oils, and the like.

Other ingredients can be present in the substrate, such as flame retardants, UV stabilizers, antistatic agents, wear resistant particles, antimicrobial additives, pigments, processing aids, dispersion additives, lubricants, colorants, modifying resins, cross-linking agents, antioxidants, foaming agents, tackifiers, and/or other conventional organic or inorganic additives commonly used in polymers (e.g., vinyl) used in the field of surface coverings.

Foamed Substrate

In a highly preferred embodiment, the present invention provides a base panel according to the first aspect of the invention, comprising a foamed substrate, preferably a rigid, foamed substrate.

Desirably, the foamed substrate comprises synthetic foam, which is a foam composition with a polymeric continuous matrix material and filler material. Suitable polymeric foams include extruded polymeric foam, expanded polymeric foam, free rise or restrained rise liquid dispensed polymeric foam, and moulded polymeric foam. The foam may comprise, and desirably comprises as a continuous phase, a thermoplastic polymer matrix material or a thermoset polymer matrix material, or mixtures thereof. The foamed substrate may include a multi-layered foam, wherein the foam layers may be identical or different in composition or properties in order to direct the characteristics of the final foamed substrate. For example, one foam layer may be a thermoplastic polymeric foam and another foam layer may be a thermoset polymeric foam. Desirably, the foamed substrate comprises any of the additives and in their respective addition levels, as described hereinbefore.

The foam density, typically, is selected depending on the particular application. Preferably, the foam density is equal to or less than about 1600 kg/m$^3$, more preferably less than about 1400 kg/m$^3$, even more preferably less than about 1300 kg/m$^3$. Preferably the foam density is equal to or more than about 400 kg/m$^3$, more preferably more than about 600 kg/m$^3$, even more preferably more than about 800 kg/m$^3$, and most preferably more than about 1000 kg/m$^3$. In preferred embodiments, the foam density of the foamed substrate is from 1050 kg/m$^3$ to 1250 kg/m$^3$, more preferably from 1100 kg/m$^3$ to 1200 kg/m$^3$.

In a preferred embodiment, the foamed substrate has a void volume from 10 vol. % to 70 vol. %. The provision of a foamed substrate with a high void volume allows for a low weight of the base panel (and thus also the final covering panel) without negatively impacting the mechanical durability of the panel, which is advantageous during transport and installation. The synthetic material to be processed can be incorporated with a blowing agent(s) or a mechanically injected gas or a supercritical fluid such as supercritical carbon dioxide during the extrusion process to make a cellular foam structure.

In one embodiment, the foamed substrate has a void volume from 10 vol. % to 70 vol. %, and preferably from 20 vol. % to 60 vol. %, and more preferably from 35 vol. % to 50 vol. %, whereby said foamed substrate comprises a foam of an open-cell structure. In another embodiment, said foamed substrate comprises a foam of a closed-cell structure. In still another embodiment, said foamed substrate is a multilayered substrate comprising at least one foam layer, preferably a closed-cell foam layer. Said multilayer substrate can further comprise 3, 4, 5, 6, 7, 8, 9 or 10 foamed layers, or a combination of foamed and non-foamed layers. In still another embodiment, said foamed substrate may comprise a combination of closed-cell foam structures and open-cell foam structures. The cells of a foam layer may have an average size (largest dimension) of from about 0.01 mm to about 0.50 mm, especially from about 0.05 to about 0.25 mm, as measured by ASTM D-3576-98.

Other Embodiments of the Substrate

The substrate may have a thickness of 1 mm to 25 mm. In one embodiment, the substrate has a thickness of 5 mm to 25 mm, and more preferably of 8 mm to 20 mm. Base panels with a substrate with this thickness can be usefully employed for making ceiling panels. In one embodiment, the substrate has a thickness of 5 mm to 15 mm, and more preferably of 8 mm to 10 mm. Base panels with this thickness can be usefully employed for making wall panels. In one embodiment, the substrate has a thickness of 2.0 mm to 6.0 mm, and more preferably with a thickness of 3.0 mm to 5.0 mm. Base panels with such a thickness can be usefully employed for making floor panels where requirements for mechanical strength are high, but where the specific surface weight (gsm) of the panel is preferably low in order to allow for an environmentally friendly transport and ease during installation.

The substrate may further comprise a reinforcement layer. Said reinforcement layer can be achieved by extrusion of reinforcement fibers with a synthetic material (e.g. by mixing the fibers in a synthetic material dryblend, or by adding the fibers just before or at the extrusion die) and/or by providing a polymer-impregnated glass fibre fabric, e.g. impregnated with polyvinyl chloride (PVC). This reinforcement layer can have the function of enhancing the dimensional stability of the base panel as well as of the final covering panel, to prevent an excessive shrinkage or expansion due to a change of temperature and to improve the stability of the panel against local pressure by a sharp object, i.e., a piece of furniture. In one embodiment, a PVC-impregnated glass fibre fabric can have a surface weight of about 250 gsm to 600 gsm, and more preferably of about 350 gsm to 500 gsm. The glass fibre may be pre-treated with an adhesion additive, which is intended to improve the adhesion between said glass fibres and said thermoplastic matrix. In another embodiment, reinforcement fibers may be present in the substrate in an amount of from 1 wt. % to 25 wt. %, by weight of the substrate. Reinforcement fibers include, but are not limited to, glass fibres, steel fibres, carbon fibres, aramid fibres, polyolefin (e.g. polyethylene or polypropylene) fibres, natural fibers, and combinations thereof.

1.2 Resilient Layer

The term "resilient" refers to the ability of a material of at least partially regaining its original shape or position after bending, stretching, compression, or other deformation.

While the substrate of the base panel primarily provides mechanical strength and dimensional stability, the resilient layer primarily provides optimized flexibility and acoustic characteristics. These characteristics are important to a variety of covering panel products such as floor panels, wall panels or ceiling panels.

The resilient layer may be a single layer, however is preferably multi-layered. Alternatively, the resilient layer may be formed through co-extrusion.

Preferably, the resilient layer comprises a synthetic material (as described hereinbefore), preferably a vinyl-based polymer such as polyvinyl chloride, which is preferably foamed. The resilient layer preferably has a surface weight of from 150 gsm to 1100 gsm, more preferably from 600 gsm to 1000 gsm and most preferably from 700 gsm to 900 gsm. Preferably, resilient layer has a thickness from 0.01 mm to 2.50 mm, more preferably from 0.1 mm to 1.5 mm and most preferably from 0.3 mm to 1.2 mm.

In a highly preferred embodiment, the top surface of the resilient layer is 'naked', i.e. the top surface is not provided or printed with a decor. As such, the top surface of the resilient layer is free of any inks, dyes and/or pigments and the visual aspect of the top surface of the resilient layer is thus determined by the materials of the layer itself, i.e. the synthetic material and additives.

However, the top surface of said resilient layer is printable. Preferably, the top surface of the resilient layer is not embossed or subjected to any surface roughening techniques.

Protective Coating

The resilient layer may further comprise a protective coating which then serves as the top surface of the resilient layer. The protective coating may comprise a synthetic material, preferably a vinyl-based polymer such as polyvinyl chloride, but is preferably substantially free of fillers to improve its printability. In a preferred embodiment, the protective coating of the base panel is at least translucent, preferably transparent, and preferably free of any inks, dyes and/or pigments. Preferably, the protective coating has a smooth surface, e.g. is not embossed or subjected to any surface roughening techniques. Such a protective coating provides a proper print surface on the one hand and protection/stability of the resilient layer during further processing, e.g. before connecting the resilient layer to the substrate.

Backing Layer

The resilient layer may comprise a backing layer. Such a backing layer is known in the art. Preferably, said backing layer is comprised of a synthetic material, preferably a vinyl-based polymer such as polyvinyl chloride. In a preferred embodiment, said backing layer is comprised of a synthetic foam material, and more specific of a resilient, soft foam material such as soft polyvinyl chloride. Preferably, said soft polyvinyl chloride foam material has a surface weight between 200 gsm and 600 gsm, more preferably between 300 gsm and 400 gsm. Preferably, said soft polyvinyl chloride foam material has a thickness between 0.2 mm to 0.6 mm, more preferably between 0.3 mm to 0.4 mm. Said backing layer may further comprise reinforcement fibres such as glass fibres or polyester fibres, preferably in an amount of 1 wt. % to 20 wt. %, based on the total weight of said backing layer, and more preferably, in an amount of 2 wt. % to 5 wt. %.

Reinforcement Layer

The resilient layer may comprise a reinforcement layer, as described hereinbefore. Preferably, said reinforcement layer is comprised of a synthetic material and glass fibres, and more preferably of an impregnated glass fibre fabric. Preferably, said reinforcement layer has a surface weight between 350 gsm and 500 gsm, more preferably between 400 gsm and 450 gsm.

In one embodiment, the resilient layer comprises a reinforcement layer between a backing layer and a synthetic layer with a top surface that is free of any decor, or between a backing layer and a synthetic layer with a top surface comprising a base colour (a primer), a basic pattern, or a combination thereof.

All or some of the layers of the resilient layer may be co-extruded.

1.3 Contact Layer

In one embodiment, the bottom surface of the resilient layer is connected to the top surface of the substrate through a contact layer. Said contact layer can be an adhesive layer. Suitable materials for use in the contact layer include those adhesive materials known in the art and compatible with plastic surfaces and foams, see U.S. Pat. No. 5,695,870. Examples include polyolefin copolymers such as ethylene/vinyl acetate, ethylene/acrylic acid, ethylene/n-butyl acrylate, ethylene ionomers, ethylene/methylacrylate, and ethylene or propylene graft anhydrides. Other useful adhesives include urethanes, copolyesters and copolyamides, styrene block copolymers such as styrene/butadiene and styrene/isoprene polymers, acrylic polymers, and the like. The adhesives may be thermoplastic or curable thermoset polymers, and can include tacky, pressure-sensitive adhesives.

1.4 Co-Extruded Base Panel

In a highly preferred embodiment, the base panel may be at least partially, but preferably completely co-extruded. This provides a further advantage that a reinforcement layer can be omitted while ensuring good dimensional stability of the base panel.

2. Covering Panel

In a second aspect, the present invention provides a covering panel such as a floor panel, a wall panel or a ceiling panel, comprising a base panel according to the first aspect of the invention, and further comprising a decor which is digitally printed on the top surface of the resilient layer of the base panel. As such, the present invention allows for a standardised production of base panels while allowing a high degree of diversification of printed decors at the end of the production process, thereby omitting the problems of excessively high material stocks as described before.

The printed decor may be extended onto the bevel or the locking system, when present on the base panel. By extending the decor onto the locking system and/or the bevel, a covering panel is obtained with more uniform and higher quality appearance.

2.1 Digitally Printed Decor

The decor can be directly applied to the top surface of the resilient layer of the base panel using any digital printing technique known in the art including laser printing or inkjet printing, the latter being preferred. This allows a fast and accurate printing of the resilient layer. The decor may also be applied by printing a basic print layer using classic (non-digital) printing techniques, and printing a finishing print layer using digital printing techniques. This allows to provide an improved printing quality of the image.

Digital printing techniques will be explained in further detail in section 3 hereinbelow.

2.2 Wear Layer

In a preferred embodiment, a wear layer is provided over the decor. Preferably, said wear layer is provided over the major surface of the decor, and more preferably over the entire surface of the decor.

The wear layer may be comprised of any suitable material known in the art, such as a polymeric film or overlay paper. In one embodiment, the wear layer is comprised of one or more layers comprising a polymeric material, such as a thermoplastic and/or thermoset material. In one embodiment, the wear layer comprises a transparent polyvinyl chloride layer. Other examples of the wear layer include, but are not limited to, acrylic polymers, polyolefins, and the like. The wear layer is however at least translucent, and preferably transparent. Examples of such wear layers can be found in, for example, U.S. Pat. Nos. 4,333,987, 4,180,615, 4,393,187 and 4,507,188. The wear layer can be made from thermoset, radiation-curable acrylate monomers and/or oligomers. The wear layer may further be a water based, solvent based, radiation-curable, non-radiation curable, UV-curable or non-UV curable system. Preferably, the wear layer is made from UV-curable polyacrylate or polyurethane, or from a hotmelt polyacrylate or polyurethane.

The wear layer has a thickness of less than 700 μm, and more preferable of less than 500 μm, and even more preferable of less than 350 μm. Most preferably, said wear layer has a thickness of less than 200 μm. This is advantageous since a sufficiently small wear layer does not incur a significant parallax between an embossing pattern and a decor. In a more preferred embodiment, said wear layer is a polyurethane layer with a thickness of between 25 μm and 200 μm.

2.3 Lacquer and Emboss

A lacquer may be provided onto the top surface of the wear layer. Said lacquer allows for an improved scratch resistance and determines the gloss of the final panel.

The covering panel may further be provided with an embossing pattern. Such embossing pattern provides the covering panel with a three-dimensional surface structure and improves the overall appearance and feel of the covering panel. Preferably, the embossing pattern is in register with the print, so as to accentuate the appearance of the decor.

3. Process of Producing Covering Panels

In a third aspect, the present invention provides a process of producing covering panels, comprising the steps of:
  i. digitally printing a decor on the top surface of a base panel according to the first aspect of the invention, and
  ii. providing a wear layer onto said decor.

The decor is directly applied on the top surface of the base panel using any digital printing technique known in the art.

"Digital printing" refers to methods of printing from a digital-based image directly to a variety of substrates. Examples of digital printing techniques include inkjet printing and laser printing. "Inkjet printing" is a digital printing technique known in the art that recreates a digital image by propelling droplets of a colorant, for example an ink, onto a substrate. Typically printheads using e.g. piezoelectric crystals are used to deposit the droplets on the substrate. Generally, there are two main technologies in use in contemporary inkjet printing processes: continuous (CIJ) and Drop-on-demand (DOD). With the term "laser printing" as used herein, a digital printing technique is meant known in art and refers to an electrostatic digital printing technique that typically allows to very rapidly produce high-quality prints by repeatedly passing a laser beam back and forth over an electron-charged, cylindrical drum, to define a differentially-charged image. Typically, the drum then selectively collects an electrically-charged, powdered colorant (i.e., toner), and transfers the image to a loaded substrate, which is then heated in order to permanently fuse the text/imagery to the substrate.

The use of digital printing techniques improves the applicability of the process and allows a higher degree flexibility of the decors that can be applied on the top surface of the resilient layer as compared to analogue printing techniques. Another advantage is that the decor can be customized. Any material surface, such as a wood surface or a stone surface, may be scanned using an optical and/or laser scanning system and uploaded in a database. The image can then be further processed using image processing software, and can then be applied as a decor to the top surface of the resilient layer using a digital printing technique. The devices used for the digital printing, for example an inkjet printer or laser printer, may be provided with software that contains a database comprising, for example, different types of wood or stone patterns or any other decor designs. For instance, if a customer desires more knots in a wood pattern, the software searches its database and fits the additional effect to the scanned wood panel surface. The database may comprise different types of decor designs, such as knots, wood-veins, "flat" appearing designs, "weatherworn" appearing designs, which may be applied on the substrate on-the-fly and randomly allowing a very broad variety of different wood structures to be obtained. Also, customers may provide a digital image themselves to be printed on a series of base panels and be further processed into a covering panel. The decor is applied to the top surface of the resilient layer in the same production line in which the base panel is produced or shortly after the production step of said base panel.

In a preferred embodiment, the decor is printed using inkjet printing. Preferably, a UV-curable ink is used whereby said UV-curable ink is at least partially cured using UV light immediately after contact with said resilient layer. This will prevent diffusion of ink droplets over the base panel.

In another embodiment, the decor is printed using laser printing which allows for rapid fixation of the print, thereby allowing a sharp and high quality decor to be obtained.

In one embodiment, the surface of the base panel onto which the decor is to be applied, is pre-treated to promote adhesion between the ink and the base panel, prior to the application of the decor. For example, the surface of the base panel may be planed, grooved, scored, roughened, sanded, subjected to plasma or corona treatment, etc. to improve the design (look and/or feel).

In one embodiment, at least one colorant is applied on the surface of said base panel, prior to the application of the decor. Preferably, said colorant is provided on the entire surface of the base panel. This will provide the base panel with a background colour onto which the decor is applied.

After the direct application of the decor on the base panel, a wear layer is applied on top of the decor. The wear layer can be applied by conventional techniques, such as with a curtain coater, direct roll coater, vacuum coater, differential roll coater, air knife coater, or spray apparatus. The wear layer may also be applied using printing techniques, such as, but not limited to, off-set printing, inkjet printing, intaglio printing, screen printing or any combination of the previous. In one embodiment, the wear layer is produced by extrusion of at least one thermoplastic material. Preferably, after extrusion, the wear layer is applied to the base panel using any type of technique known in the art such as, for example, using adhesives or by using hot pressing.

In a preferred embodiment, the present invention provides a process according to the third aspect of the invention, whereby the base panel is dimensioned before being printed. This is advantageous since during cutting, some material will inevitably be removed. The base panel may further be provided with a locking system and/or a bevel on any or all of its side edges prior to printing the decor. This will finally result in a covering panel of improved quality.

Finally, after providing said decor and a wear layer, a lacquer and/or an emboss pattern may be provided to said printed base panel according to methods known in the prior art and as described above.

4. System for Printing Custom Images on a Base Panel

In a fourth aspect, the present invention provides a system for producing covering panels such as floor panels, wall panels or ceiling panels, comprising: a server for processing instructions; a database, operatively connected to said server, configured to store one or more images; a module, operatively connected to said server, for uploading one or more customized images and for storing said images into said database; a digital printer, operatively connected to said server, configured to print said one or more customized images onto a set of base panels according to the first aspect of the invention.

Such a system is advantageous in that it allows customers, i.e. professional designers, to develop a custom-made covering panel or a custom-made set of covering panels that form one single image.

EXAMPLE

Figure 2:
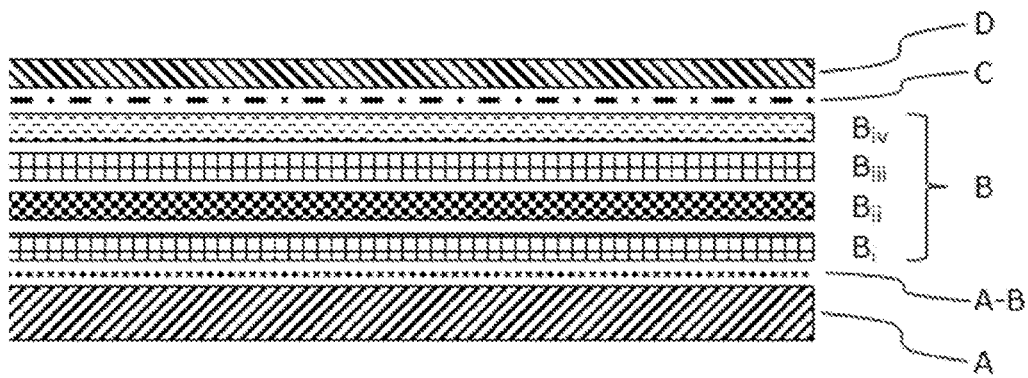
FIG. 2 shows a covering panel according to the second aspect of the invention.

The following example, with reference to FIGS. 1 and 2, is intended to further clarify the present invention, and is nowhere intended to limit the scope of the present invention.

Base Panel

A substrate (A) of the base panel was made by extruding a drylend with the following composition (numbers as wt %):

| | |
|---|---|
| PVC (Vinnolit ® S3160, Vinnolit GmbH & Co. KG) | 50.25 |
| Chalk (Polcarb ™ 40SV, Imerys) | 42.71 |
| Ca/Zn stabiliser/lubricant (Baeropan MC90060 P, Baerlocher GmbH) | 2.01 |
| Processing aid (Paraloid ™ K125 ER, DOW) | 0.25 |
| Impact modifier (Paraloid ™ KM376-L, DOW) | 2.01 |
| Lubricant (Baerolub LP-L, Baerlocher GmbH) | 1.01 |
| Foaming agent (Tracel ® TSE 4170 ACR, Tramaco) | 0.50 |
| Black colour | 1.26 |

The extruded substrate had a thickness of 3.5 mm, a density of 1200 kg/m$^3$, and a K-value of 60.

A resilient layer (B) with a thickness of 1.05 mm was made on a conventional cushion vinyl-line, with the following layers:

- a foamed PVC backing layer (thickness 0.13 mm, surface weight 200 g/m$^2$) (Bi)
- a PVC-impregnated glass fiber (Owens Corning, thickness 0.42 mm, surface weight 425 g/m$^2$ after impregnation) (Bii)
- a white PVC layer (thickness 0.3 mm, surface weight 250 g/m$^2$)(Biii)
- a transparent PVC protective coating (thickness 0.20 mm, surface weight 240 g/m$^2$) (Biv)

A polyurethane hotmelt contact layer (A-B) (Jowatherm-Reaktant® 609.30, Jowat AG) was applied at a level of 70 gsm to the substrate (A) by means of roller coating and the resilient layer was pressed onto the substrate by means of calander press.

Covering Panel

A wood-decor (C) was printed onto the resilient layer (B), using a digital ink-jet single-pass printer (Barberán) at an ink level of 7.74 ml/m$^2$.

Onto the printed decor (C), a wear layer (D) of a hotmelt polyurethane coating containing corundum particles (PUR 717, Kleiberit) is applied at a level of 80 g/m$^2$.

The invention claimed is:

1. Base panel suitable to be processed into a floor panel, a wall panel or a ceiling panel, consisting of the following layers:
    i. a substrate comprising polyvinyl chloride having a top surface, wherein the substrate comprises from 10 wt. % to 70 wt. % of filler, and wherein the substrate is a foamed substrate; and
    ii. a resilient layer comprising polyvinyl chloride having a top surface and a bottom surface, whereby the bottom surface is connected to the top surface of said substrate.

2. Base panel according to claim 1, whereby said resilient layer comprises a backing layer.

3. Base panel according to claim 1, whereby said resilient layer comprises a reinforcement layer.

4. Base panel according to claim 1, whereby the top surface of said resilient layer is printable.

5. Base panel according to claim 1, whereby the top surface of said resilient layer does not comprise a decor.

6. Covering panel including a floor panel, a wall panel or a ceiling panel, comprising the base panel according to claim 1, further comprising a digitally printed decor on the top surface of said resilient layer.

7. Covering panel according to claim 6, comprising a wear layer on said digitally printed decor on the top surface of said resilient layer.

8. Covering panel according to claim 7, whereby said wear layer has a thickness of less than 500 μm.

9. Covering panel according to claim 7, whereby said wear layer comprises polyurethane and/or polyacrylate.

10. Covering panel according to claim 7, whereby a lacquer is provided onto the top surface of said wear layer.

11. Process of producing covering panels, comprising the steps of:
    providing a base panel according to claim 1,
    i. digitally printing a decor on the top surface of the base panel, and
    ii. providing a wear layer onto said decor.

12. Process according to claim 11, wherein the providing the base panel further comprises coextruding the substrate and the resilient layer.

13. A system comprising producing covering panels for use as floor panels, wall panels or ceiling panels, the system further comprising:
    a server;
    a database, operatively connected to said server, configured to store one or more images;
    a module, operatively connected to said server, for uploading one or more customized images and for storing said images into said database;
    a digital printer, operatively connected to said server, configured to print said one or more customized images onto a set of base panels according to claim 1.

14. Base panel of claim 1, further comprising a contact layer between the bottom surface of said resilient layer and the top surface of said substrate.

\* \* \* \* \*